(12) United States Patent
Fourdrinier

(10) Patent No.: US 11,014,402 B2
(45) Date of Patent: May 25, 2021

(54) VARIABLE DIAMETER WHEEL

(71) Applicant: BEAUTIFUL AND USABLE, Vallières les Grandes (FR)

(72) Inventor: Vincent Fourdrinier, Vallières les Grandes (FR)

(73) Assignee: BEAUTIFUL AND USABLE, Vallières les Grandes (FR)

( * ) Notice: Subject to any disclaimer, the term of this patent is extended or adjusted under 35 U.S.C. 154(b) by 149 days.

(21) Appl. No.: 15/760,958

(22) PCT Filed: Aug. 31, 2016

(86) PCT No.: PCT/FR2016/052155
§ 371 (c)(1),
(2) Date: Mar. 16, 2018

(87) PCT Pub. No.: WO2017/046468
PCT Pub. Date: Mar. 23, 2017

(65) Prior Publication Data
US 2018/0257429 A1 Sep. 13, 2018

(30) Foreign Application Priority Data

Sep. 18, 2015 (FR) ...................................... 1558839

(51) Int. Cl.
*B60B 25/02* (2006.01)
*B60B 19/04* (2006.01)

(52) U.S. Cl.
CPC .............. *B60B 25/02* (2013.01); *B60B 19/04* (2013.01)

(58) Field of Classification Search
CPC ......... B60B 19/04; B60B 15/10; B60B 15/12; B60B 15/14; B60B 15/16; B60B 15/26; B60B 15/263; B60B 15/266; B60B 25/02
See application file for complete search history.

(56) References Cited

U.S. PATENT DOCUMENTS

| | | | | |
|---|---|---|---|---|
| 245,564 A * | 8/1881 | Ruth | ........................ | B60B 15/10 301/46 |
| 1,366,810 A * | 1/1921 | Kimble | .................... | B60B 15/10 301/47 |
| 4,601,519 A * | 7/1986 | D'Andrade | ............. | B60B 15/12 301/41.1 |

FOREIGN PATENT DOCUMENTS

| CN | 102896970 A | * | 1/2013 | |
|---|---|---|---|---|
| DE | 336525 C | * | 5/1921 | ............. B60B 15/16 |

(Continued)

OTHER PUBLICATIONS

International Search Report for PCT/FR2016/052155 dated Nov. 14, 2016.

*Primary Examiner* — Kip T Kotter
(74) *Attorney, Agent, or Firm* — Bachman & LaPointe, P.C.

(57) ABSTRACT

A variable diameter wheel comprises a central hub, a peripheral band formed by a plurality of arcuate segments, each one of the arcuate segments being linked to the hub, wherein the hub comprises radial guide means for sliding retractable radial arms, each one of the retractable radial arms being secured to the distal end thereof of one of the arcuate segments, the opposing end being provided with a connection member with a mobile plate coaxial with the hub and in relative rotation with respect to the hub, the mobile plate having curved guide areas, each one of the connection members cooperating with one of the arms in order to control the linear and radial movement of the proximal end of the corresponding arm.

7 Claims, 5 Drawing Sheets

(56) References Cited

FOREIGN PATENT DOCUMENTS

| EP | 0665128 A1 | 8/1995 | |
|----|-----------|--------|---|
| FR | 584458 A * | 2/1925 | ............. B60B 25/02 |
| GB | 251256 A | 11/1926 | |
| GB | 498623 A | 1/1939 | |

* cited by examiner

VARIABLE DIAMETER WHEEL

BACKGROUND OF THE INVENTION

The present invention relates to the field of variable diameter wheels enabling to produce a tyre tread or drive belt of variable length. Such wheels have multiple applications:

Transport equipment, where the variation in wheel diameter enables the wheel to be adapted to variable ground types Individual equipment such as wheelchairs, city bicycles, etc., where reducing the diameter enables to reduce volume outside of usage periods Belt drive disc, where the variation in diameter of a pair of wheels enables to modify the characteristics of a transmission Suitcase with wheels, where the variation in diameter of the wheels enables an adaptation to the ground type whereon the suitcase is moved Children's pushchairs, also enabling one to adapt the diameter of the wheels to the ground type.

Of course, these are simple examples of applications of such variable diameter wheels.

In the state of the art GB498623, a device intended to equip a fixed section wheel that has retractable clamps is known. This device is coaxial with a fixed size wheel and enables to improve adhesion on wet ground. These clamps are formed by retractable arms, each having a distal end forming tips which sink into soft ground.

Also, patent GB251256 defining a wheel having constant radius bandage sections which are adjustable by tangential connection parts, to facilitate the replacement of the tyre tread, is known.

Also, European patent EP0665128 defining an exterior variable diameter wheel is known. This diameter wheel comprises a tube having four holes penetrating on the cylindrical wall thereof, a seal having diaphragms corresponding to the penetration holes is assembled on the tube. Sliders are pushed and moved in the radial orifices, such that the exterior diameter of the wheel is increased by injecting compressed air from a hole arranged on an axis of an axle through the membranes. When the compressed air is used up, the exterior diameter of the wheel decreases and returns to the original size.

The solutions of the prior art implement relatively complex mechanisms inside the wheel, which makes them fragile and not very suitable for achieving small sizes like suitcase wheels.

Moreover, the number of mobile parts to ensure the variation in diameter reduces the efforts and the torque which can be transmitted by the hub to the wheel rim and causes rapid wear and tear to be produced from the unit, which can damage the lifespan and the functioning of the wheel.

Finally, the solution proposed by patent GB498623 necessarily connects a tyre tread with a constant diameter to retractable clamps improving the adhesion when the ground is soft. The diameter of the wheel itself is not variable.

SUMMARY OF THE INVENTION

To remedy these disadvantages, the present invention proposes a simple and robust solution enabling one to easily ensure a doubling of the minimum section of the wheel and a quadrupling of the unwound length of the rim.

The invention relates, according to the more general acceptance, to a variable diameter wheel constituted by a central hub, a peripheral band formed by a plurality of arcuate segments, each one of the arcuate segments being linked to said hub, characterised in that said hub comprises radial guide means for the sliding of retractable radial arms being secured to the distal end thereof of one of said arcuate segments, the opposing end being provided with a connection member with a mobile plate coaxial with said hub and in rotation with respect to said hub, said mobile plate having curved guide areas, each one of said connection members cooperating with one of said arms in order to control the linear and radial movement of the proximal end of the corresponding arm.

Advantageously, said hub has section sliders in addition to the retractable radial arms section, to enable sliding of the arm with respect to the corresponding slider.

According to an alternative, the distal end of said curved guide areas is substantially tangential.

According to another alternative, said mobile plate is formed of two additional discs arranged on either side of said retractable arms.

Preferably, said guide areas are formed by spiral grooves cooperating with a connection member formed by a nipple extending axially with respect to the proximal end of each one of said retractable arms.

According to an arcuate embodiment, each one of said arcuate segments has at least one peripheral groove to receive an arcuate extension of at least one adjacent arcuate segment.

Preferably, each one of said arcuate segments has a plurality of peripheral grooves to receive the arcuate extensions of the two adjacent arcuate segments.

The invention also relates to the application of such a wheel to produce:

a drive system comprising a transmission belt and two pinions, characterised in that at least one of said pinions is constituted by an above-mentioned variable diameter wheel a wheelchair comprising above-mentioned variable diameter wheels a vehicle comprising variable diameter wheels.

BRIEF DESCRIPTION OF THE DRAWINGS

The present invention will be best understood upon reading the description which follows, referring to a non-limitative example of an embodiment and to the appended drawings, where.

DETAILED DESCRIPTION

The wheel according to the invention has the specificity of reversibly doubling the circumference of a wheel in order to improve current uses, e.g. to limit the volume of an everyday object, suitcases, pushchairs, while keeping a continuous roller surface, whatever the section of the wheel.

With a suitcase and the tiny wheels thereof, approaching stairs, there are no other solutions to provide it with. The invention enables one to modify the diameter of the wheel to best adapt it to the type of traveled surface.

In the same way, with fixed section wheels, the user must choose between compactness/storage and handling/clearance of a pushchair, whereas a wheel according to the invention enables one to adapt the radius to satisfy the usage context at any time.

Other applications are possible in many other fields, a wheelchair (for volume and storage), carriers, trolleys, folding bikes, etc.

Such a wheel is also applicable to a vehicle having clearance needs (military, or rough terrain robotic vehicle), enabling, e.g., to go from a 21-inch wheel to a 42-inch wheel, which considerably increases the capacities and abilities thereof.

Such a wheel according to the invention enables one to incorporate electrical feedback and/or to integrate motorization (in order to transform it into wheel/engine).

Finally, such a variable diameter wheel enables one to achieve variable transmissions by belt or by chain, e.g. by using a pair of wheels, of which the variation in diameter is modified in an opposing manner: thus, a variable transmission ratio is obtained, with a constant belt length. If the diameter of a wheel can vary by 100% by doubling the diameter, the transmission ratio can vary continuously between 4 (corresponding to a wheel driving in maximum extension and a wheel driven in minimum extension). For an automotive application, it is thus possible to use a constant speed engine, corresponding to an optimal functioning point, and to adjust the speed by acting on the diameters of the two variable section wheels combined by a belt.

Figure 1:
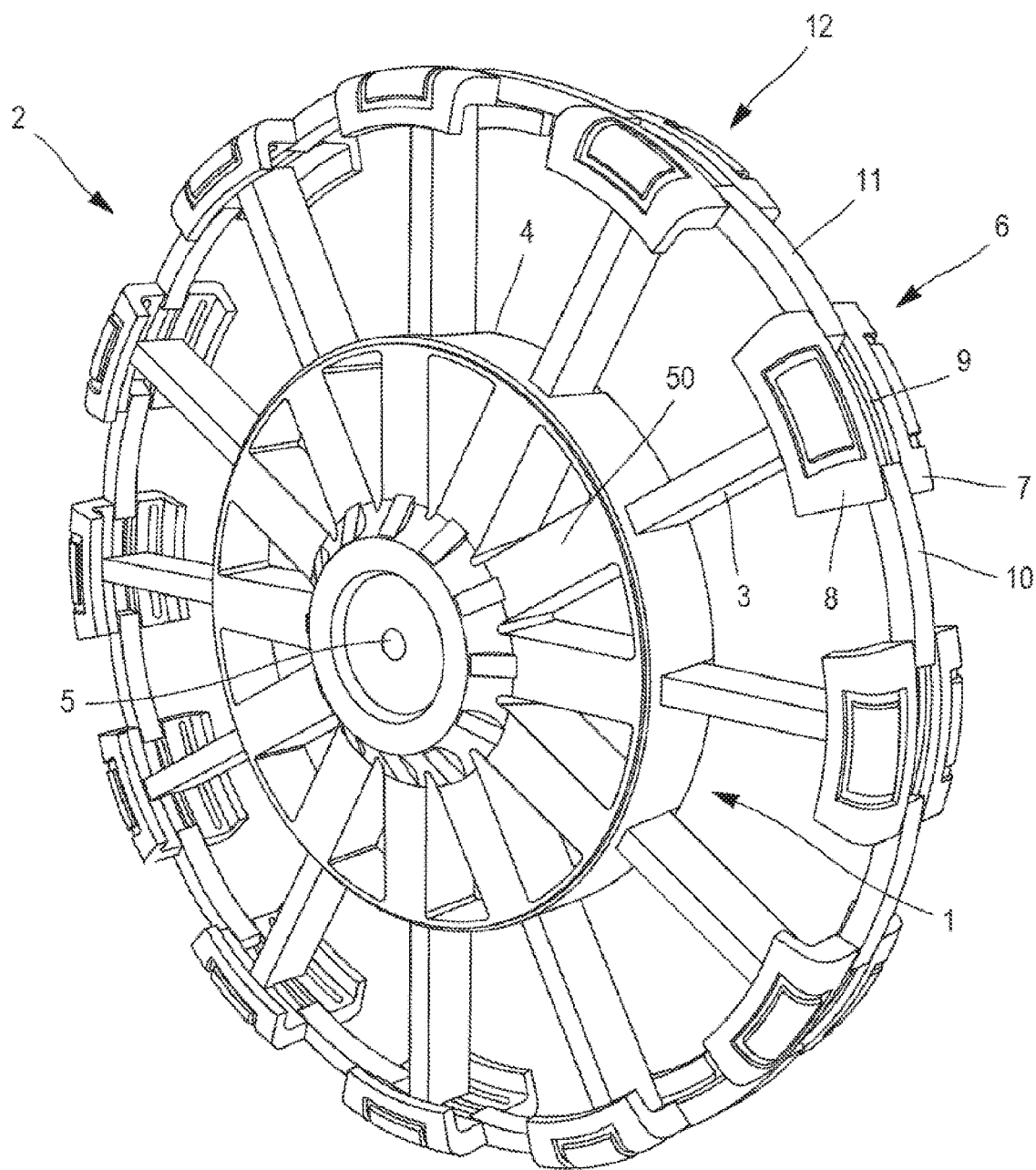
FIG. 1 represents a front view of the wheel in the largest extension thereof
Figure 2:
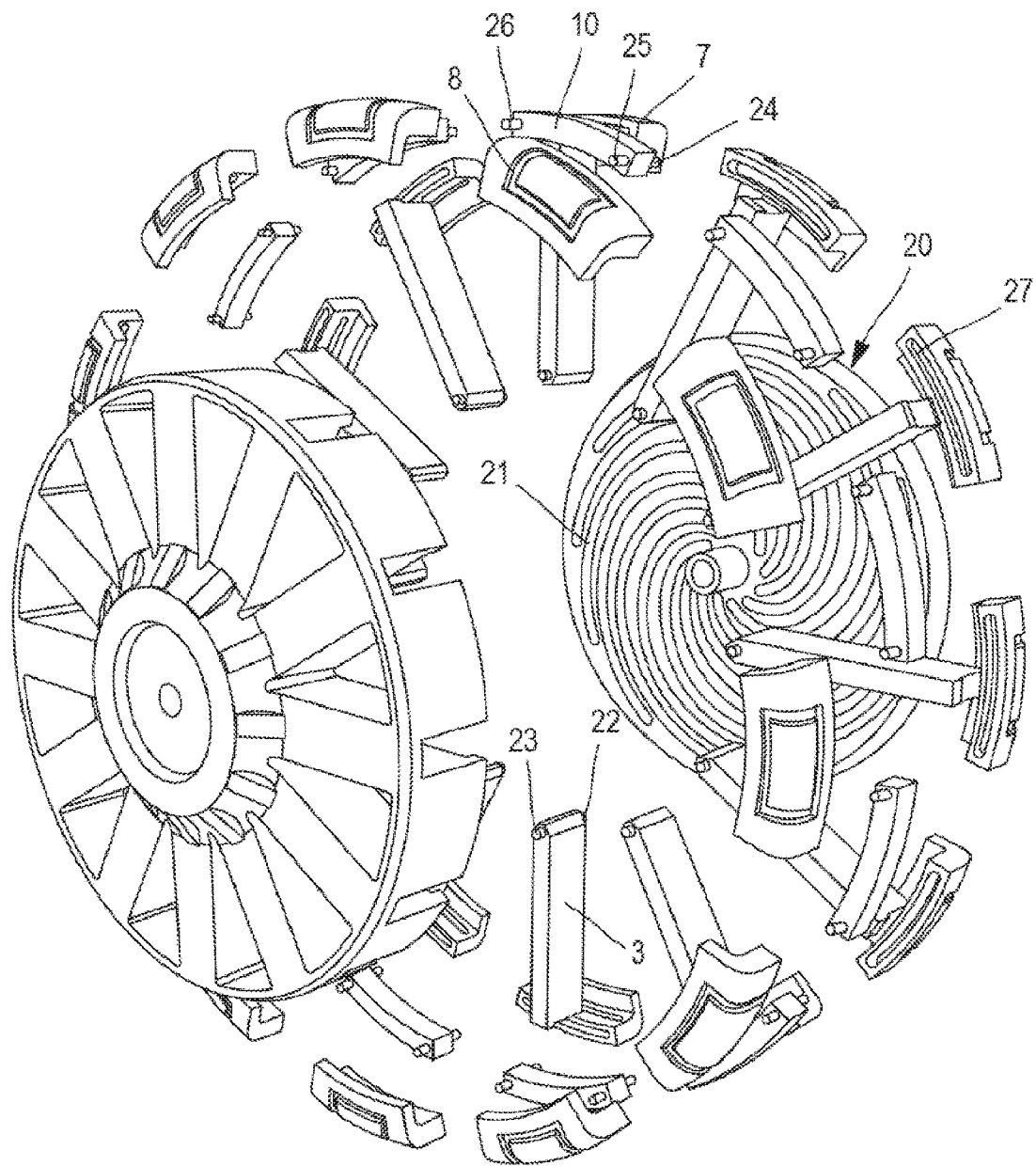
FIG. 2 represents an exploded view of the wheel

FIGS. 1 and 2 represent views of the wheel in the deployed configuration thereof, wherein it has the maximum exterior diameter.

It comprises a hub (1) and a rim (2) connected by the retractable arms (3). These arms (3) extend radially and have, in the example defined, a rectangular section.

The hub (1) is constituted of a body (4) having a central axis (5) and sliders extending radially.

These sliders (50) have a transversal section, additional to that of the retractable arms (3) to enable the sliding of these arms (3) inside the corresponding slider (50), with a smooth bearing forward guide or possible roller elements.

Each arm (3) is extended to the distal end thereof of an arcuate segment (6) extending over an angle of 360/N degrees, where N means the number of arms (3).

Each arcuate segment (6) has a tyre tread section formed of two rigid, symmetrical parts (7, 8) with respect to the median plane in the example defined, separated by a slot (9) and a connection segment (10) of an additional shape to the slot (9).

The connection segment (11) of the adjacent arcuate segment (12) slides inside the slot (9) to enable a variation in the circumference of the wheel according to the change in diameter, and to ensure an uninterrupted roller surface.

As seen in FIG. 2, the connection segment (10, 11) is formed by a block of which the length corresponds to the slot (9), extended at each end by a pair of nipples (24 to 26) ensuring the guiding with respect to the arcuate guide grooves (27) provided on the interior face of the two rigid parts (7, 8) of each arcuate segment (6).

The functioning is as follows:

The wheel further comprises a control plate, formed of two discs (20) coaxial with the hub (1), arranged symmetrically on either side of the arms (3).

Each disc (20) has N grooves (21), N corresponding to the number of arms (3).

These grooves have a spiral shape, with an end the closest to the substantially tangential radius, forming an angle of between 5 and 15 degrees with respect to the tangent, and extending up to a peripheral area where the end of the groove also forms an angle of between 5 and 15 degrees with respect to the tangent.

The groove (21) extends over an angular sector of the disc (20) of 180° in the example defined, but it can extend over a smaller sector, of between 90 and 180° to enable a rapid variation of the diameter, or on the contrary, a larger sector, of between 180 and 360° to enable a more gradual variation of the diameter.

The curvature profile of the grooves (21) is constant. It can also be variable, with an increasing then decreasing variation of the angle between the tangent at a point of the spiral and the radial axis via this same point.

Each groove is defined by a function of type:

$$R = fn(alpha)$$

Where R means the distance from one point of the groove with respect to the axis of the disc.

Alpha means the angular position of this point with respect to a reference radius via the proximal end of the groove.

Each groove is offset with respect to the preceding one, from an angle of 360/N where N means the number of arms.

The function fn can be a constant function, of type 360/K where K means the range of angular movement of the disc between the retracted position and the deployed position of the arms. K can be more than or less than 1.

The function fn can also be a progressive function, e.g., of type sinus, to control a slow development at the start and at the end of the extension of the arms, and quicker development between these two locations. It can also have one or more bearings to enable an indexed extension.

Each arm (3) has at the proximal end thereof, two symmetrical lugs (22, 23) with respect to the median plane, intended to cooperate with a groove (20) in order to control the linear movement of the end of the arm (3) in the corresponding guide slider (50).

Figure 3:
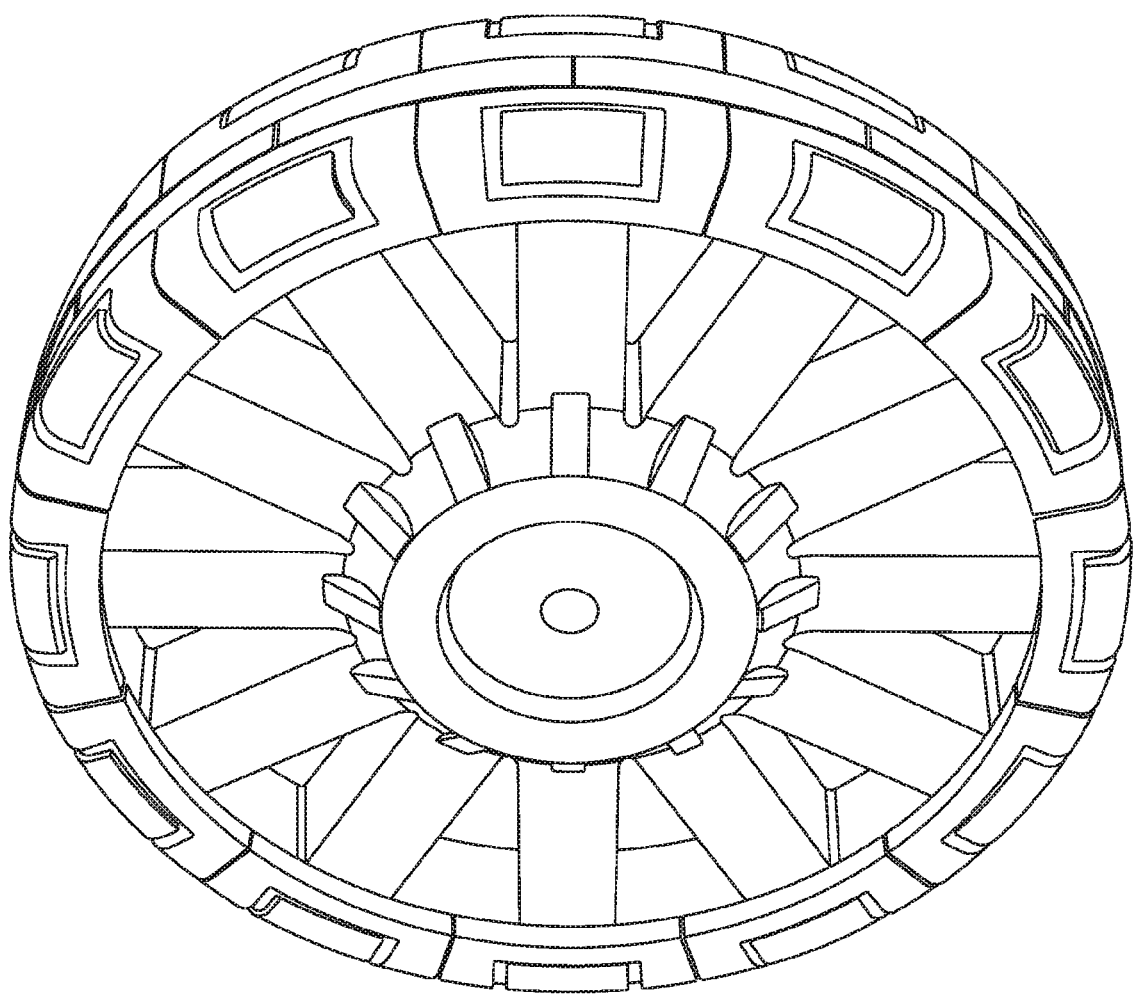
FIG. 3 represents a front view of the wheel in retracted configuration

The functioning is as follows. In the retracted position represented in FIG. 3, the arms (3) are retracted, the disc (20) being positioned angularly with respect to the hub (1) in a position wherein the proximal ends of the grooves (21) are aligned with the radial axis via the corresponding arm (3).

When this disc (20) is made to turn with respect to the hub (1), the contact point between the lugs (22, 23) provided at the proximal end of the arm (3) and the corresponding groove (21) is moved towards the periphery of the disc (20), which causes arms (3) to be erected into the deployed position.

Guiding the arms (3) by the sliders (50) ensures a great robustness of the wheel, whatever the level of extension.

Figure 4:
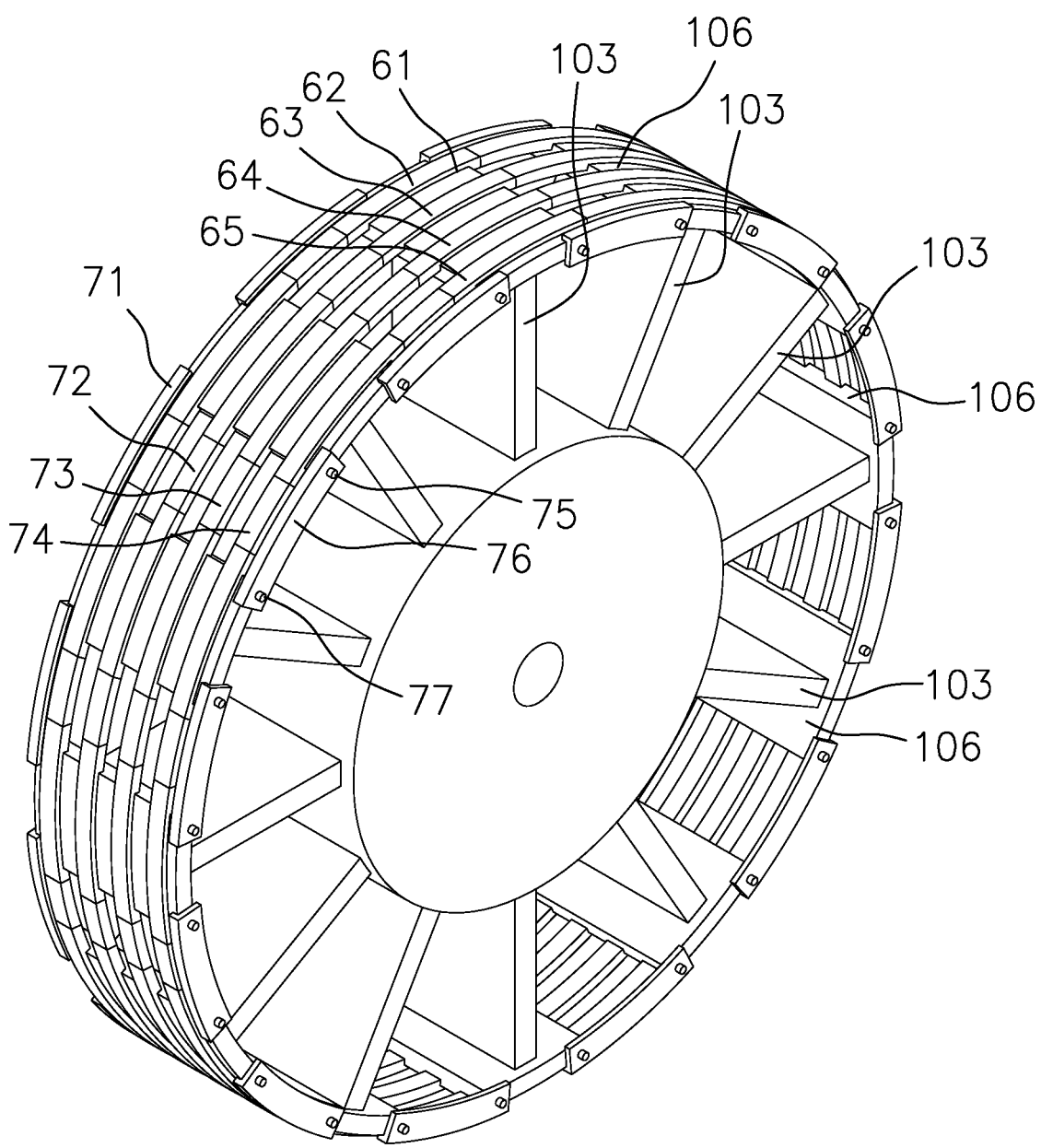
FIGS. 4 and 5 represent views of an alternative embodiment of a wheel, respectively in maximum diameter position and minimum diameter position.

The wheel according to another alternative embodiment of the invention shown at FIG. 4 comprises a tyre tread constituted of arcuate segments (106) extending the retractable arms (103) and extending perpendicularly to the median plane of the corresponding retractable arm.

These arcuate segments (106) are constituted by a deck (61) in tile-form, whereon are fixed the arcuate bands (62 to 65), bordering either side of the deck (61). These arcuate bands (62 to 65) define, between themselves, the arcuate grooves enabling the sliding of arcuate slides (72 to 74). These arcuate slides (72 to 74) are combined by a connection part formed of two lateral flanges (71, 75) linked by transversal rods (76, 77) crossing the channels provided at the ends of the arcuate slides (72 to 74) and the slots crossing the arcuate bands (62 to 65).

The unit formed by the arcuate slides (72 to 74), the two lateral flanges (71, 75) and the two transversal rods (76, 77) forms a segment which could slide between the arcuate grooves formed between the arcuate bands (62 to 65) of the two adjacent arcuate segments.

Figure 5:
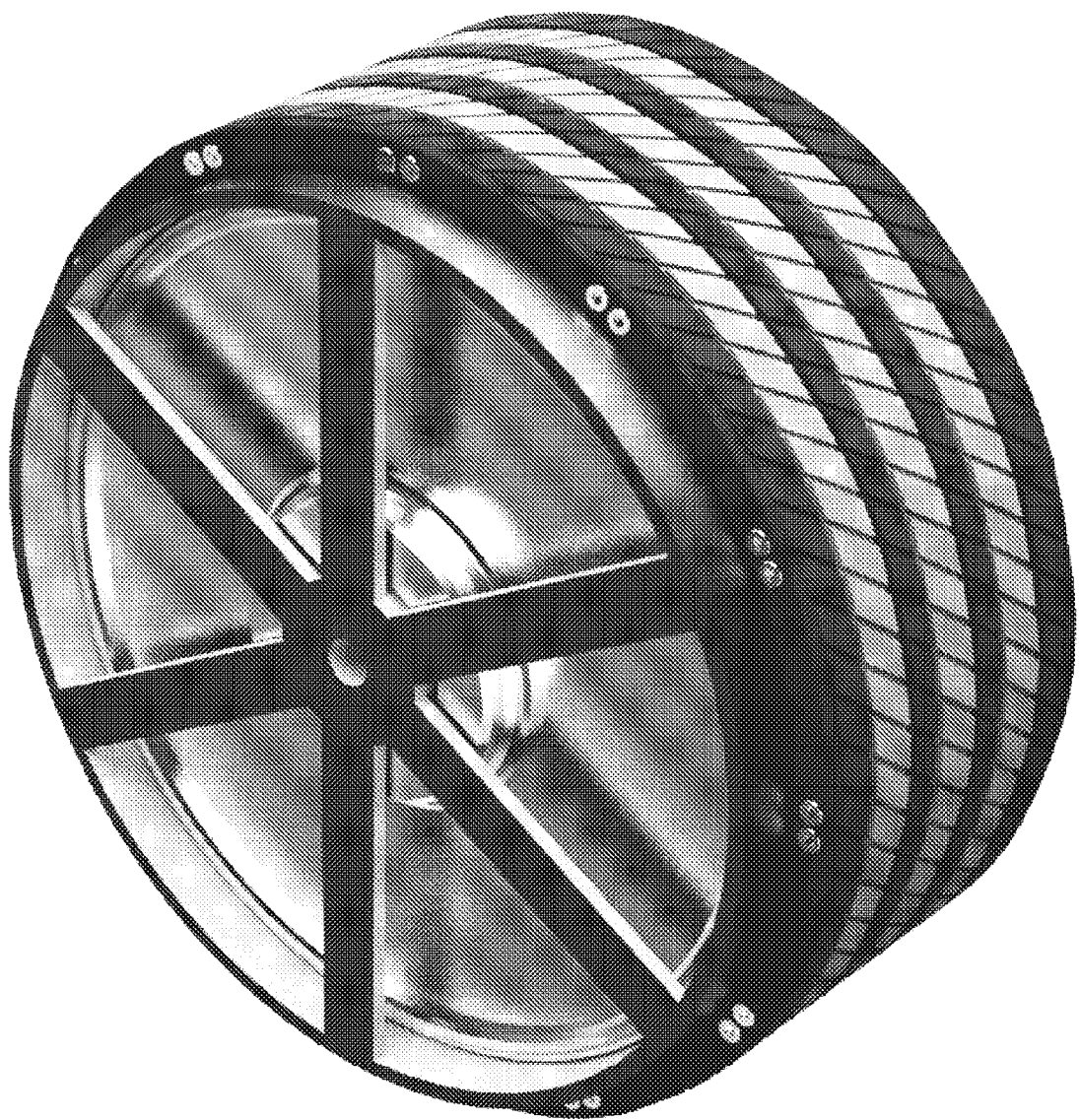

The arcuate slides (72 to 74) have a determined thickness to fill the space between two arcuate bands (62 to 65) and to form a constant roller surface over the width of the wheel, in the coverage areas. When the wheel is totally retracted as represented in FIG. 5, it has an annular roller surface. In the extended position represented in FIG. 4, the annular roller surface is meshed.

Possibly, an elastic membrane can cover the periphery of the wheel to ensure the closing of the meshed parts thereof.

The invention claimed is:

1. A variable diameter wheel comprises a central hub, a peripheral band formed by a plurality of arcuate segments, wherein adjacent arcuate segments are connected with a connection segment, each one of the arcuate segments being linked to said hub, wherein said hub comprises sliders for sliding retractable radial arms, each one of the retractable radial arms being secured to a distal end thereof of one of said arcuate segments, an opposing end being provided with a connection member with a mobile plate coaxial with said hub and in relative rotation with respect to said hub, said mobile plate having curved guide areas in the form of N grooves, where N equals a number of said radial arms, said connection member cooperating with one of said arms in order to control the linear and radial movement of the proximal end of the corresponding arm; wherein said arm is extendable to the distal end of the arcuate segment extending over an angle of 360/N degrees, where N equals the number of said radial arms.

2. The variable diameter wheel according to claim 1, wherein said sliders comprise a transversal section that corresponds with a transversal section of the retractable radial arms to enable a sliding of the arms with respect to a corresponding slider.

3. The variable diameter wheel according to claim 1, wherein the distal end of said curved guide areas is substantially tangential.

4. The variable diameter wheel according to claim 1, wherein said mobile plate is formed of two discs arranged on either side of said retractable arms.

5. The variable diameter wheel according to claim 1, wherein said guide areas are formed by spiral grooves cooperating with the connection member, the connection member comprising a nipple extending axially with respect to the proximal end of each one of said retractable arms.

6. The variable diameter wheel according to claim 1, wherein each one of said arcuate segments has at least one peripheral groove to receive an arcuate extension of at least one adjacent arcuate segment.

7. The variable diameter wheel according to claim 6, wherein each one of said arcuate segments has a plurality of peripheral grooves to receive the arcuate extensions of the at least one adjacent arcuate segments.

\* \* \* \* \*